Feb. 7, 1956 V. HAENSEL 2,733,979
METHOD FOR REMOVING HYDROGEN SULFIDE FROM GASEOUS STREAMS
Filed Oct. 18, 1951
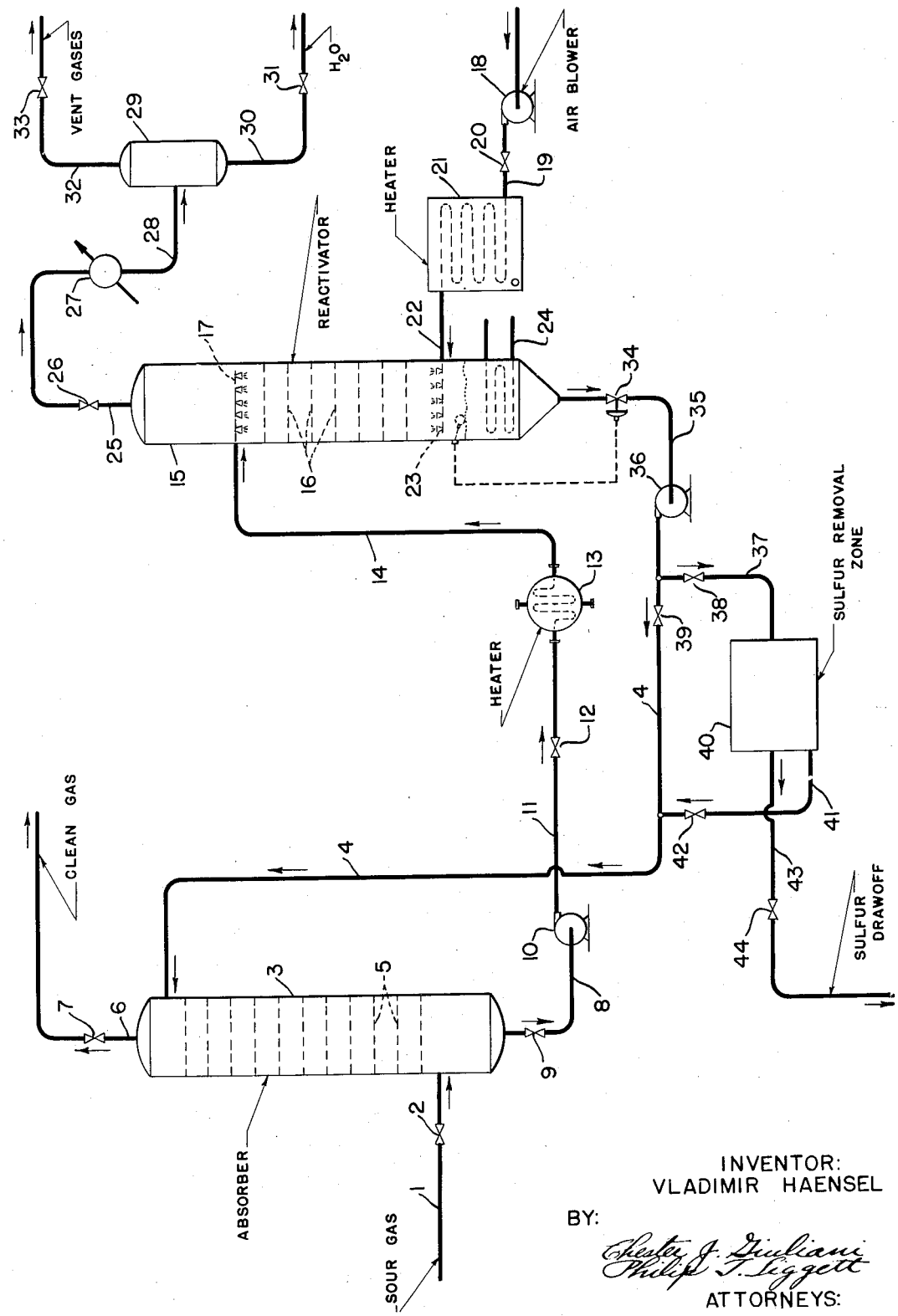
INVENTOR:
VLADIMIR HAENSEL
BY:
*Chester J. Giuliani*
*Philip T. Leggett*
ATTORNEYS:

United States Patent Office 2,733,979
Patented Feb. 7, 1956

---

2,733,979

METHOD FOR REMOVING HYDROGEN SULFIDE FROM GASEOUS STREAMS

Vladimir Haensel, Hinsdale, Ill., assignor to Universal Oil Products Company, Chicago, Ill., a corporation of Delaware Application October 18, 1951, Serial No. 251,862

3 Claims. (Cl. 23—2)

This invention relates to an improved method for removing hydrogen sulfide from gaseous and vaporous streams to purify them. More specifically there is provided an improved continuous regenerative $H_2S$ removal process which utilizes a finely divided solid contact material such as a metal oxide or hydroxide that is sulfidable and which may be carried in suspension by a suitable liquid medium through absorption and reactivation zones.

There are various known methods for removing hydrogen sulfide from gaseous streams, that include dry and wet processes as well as regenerative and non-regenerative processes. The regenerative processes are of course usually the most advantageous with modern-day continuous processing units. Iron oxide is used in a dry batch-type of operation, with the gas to be purified passing through the bed of iron oxide so that hydrogen sulfide is absorbed in a reaction forming iron sulfide and water. The resulting iron sulfide may be replaced with fresh solid iron oxide or if desired, the iron sulfide can be regenerated by blowing it with air to oxidize the material and reform iron oxide. However, it is recognized that this process requires considerable space and the labor costs are high because of the necessity of exchanging the material in a batch type of operation. Continuous fluidized operations using finely divided iron oxide have been tried for effecting the purification of hydrogen sulfide containing streams, but in general the fluidized operations have been unsuccessful since the reaction between hydrogen sulfide and the iron oxide takes place only when there is moisture present and it is of course difficult to fluidize a moist solid material.

In the various wet-treating processes a reagent is utilized to absorb the hydrogen sulfide, for example caustic soda or lime may be used in a non-regenerative type of absorption operation. The non-regenerative operations, are, however, expensive because it is necessary to periodically discard the absorbent agent. In wet regenerative processes, such materials as tri-potassium phosphate and various of the amines have been employed with some success. In particular diethanolamines has been used in the "Girbotol" process. This latter process is relatively effective in its removal of the hydrogen sulfide from a gaseous stream but there is sometimes trouble from corrosion where carbon dioxide is present with the hydrogen sulfide. Also, the diethanolamine is a relatively expensive medium so that it is of disadvantage from the economic standpoint.

It is a principal object of the present invention to provide a suspensoid operation for removing hydrogen sulfide from a gaseous stream, with the utilization of a suitable finely divided solid medium that readily undergoes both sulfidation and oxidation and which may be carried in suspension within a relatively stable liquid medium.

It is also an object of the present invention to utilize a suspension of a relatively inexpensive solid medium in a suitable liquid carrying medium and thereby provide a continuous operation where the suspension passes between separate absorption and reactivation zones.

It is a still further object of the invention to utilize a liquid medium for suspending the sulfidable solid material that is somewhat hygroscopic and suitable for effecting the absorption and removal of water that is formed in the reaction between hydrogen sulfide and the solid material so that a resulting treated and purified gaseous stream can be obtained which is substantially devoid of any water.

In a broad aspect the present invention provides a process for removing hydrogen sulfide from a gaseous stream in a manner which comprises passing said gaseous stream into contact with a finely divided solid compound of a metal selected from the group of oxides and hydroxides thereof capable of undergoing sulfidation and oxidation reversibly and being suspended in a polar organic liquid medium having a boiling point above that of water.

There may be various metal oxides which are reversibly sulfidable and oxidizable, particularly those of the metals included in the transition series of elements, however, a preferred operation makes use of those which may be obtained at low cost and which are at the same time capable of undergoing the desired reversible reaction while suspended in a liquid medium. For example, iron oxide is easily and economically obtainable and is therefore a preferable material. It should also be noted that the hydroxides of some of these metals may be utilized, where they are obtainable in a form that can be powdered or otherwise formed into a finely divided state for suspension within a suitable carrying medium. For example, iron hydroxide in a finely divided state may well be used in this improved suspensoid operation.

The liquid carrying medium is preferably one that has a boiling point higher than water so that the suspension may be passed to the regenerator and subjected to heating and blowing by air to in turn effect, along with oxidation of the solid particles, the vaporization and removal of the water which is formed in the sulfidation of the metal oxide or hydroxide. A preferable liquid also is capable of absorbing hydrogen sulfide to some extent so that it is brought into contact with the suspended solid material in the absorption zone. Further, it is desirable to have a liquid medium which is capable of absorbing water formed in the sulfidation reaction so that a water-free gaseous stream may be discharged from the absorption zone. A polar organic liquid medium such as ethylene glycol is particularly advantageous in the present improved process in that it can absorb hydrogen sulfide as well as water, and at the same time it has a boiling point higher than water so that the resulting contacted suspension can be passed to a reactivation zone and heated to vaporize and remove the water without losing any appreciable amount of the suspending medium itself.

A polar organic liquid, that is, one which will ionize in solution, is also desirable in that it aids the sulfidation reaction, as for example, the formation of iron sulfide and water when hydrogen sulfide comes into contact with the iron oxide particles in the suspension. While ethylene glycol is a desirable liquid, it is not intended to limit the present operation to that medium alone, since for example, various other polyhydric alcohols, such as diethylene glycol may be used, or various of the glycol ethers, of suitable mixtures thereof. From an economic standpoint, a preferable operation utilizes a polar organic liquid medium which has the desired hygroscopic characteristic and is higher boiling than water, and in addition is obtainable at a relatively low cost.

A desirable specific embodiment of the present invention provides a regenerative process for removing hydrogen sulfide from a gaseous stream in a manner which comprises, passing the stream into contact with a suspension of iron oxide in ethylene glycol maintained within an absorption zone and in turn effecting the formation of iron sulfide and water, removing a substantially sulfur-free gaseous stream from the absorption zone and a resulting liquid suspensoid stream containing the reaction products of water and finely divided iron sulfide suspended within the ethylene glycol, subsequently subjecting the withdrawn stream to heat and contact with a free-oxygen containing stream whereby to effect the removal of said resulting water and the oxidation of the iron sulfide to iron oxide, and returning the resulting reactivated suspension of the finely divided iron oxide in the ethylene glycol to the aforsaid absorption zone, whereby the suspension is re-used for contacting the hydrogen sulfide containing gaseous stream.

Additional advantages and features of the present improved suspensoid type of $H_2S$ removal operation will be made more apparent upon reference to the accompanying drawing and the following description thereof.

In the drawing, there is shown one specific embodiment of the present improved method of removing hydrogen sulfide from a gaseous stream by means of a continuous regenerative system. It may be assumed that a gaseous stream, such as for example, a hydrogen stream containing $H_2S$ and obtained from a separator or receiver of a catalytic reforming unit, will be treated in the present system. When charging sulfur containing hydrocarbon charge stocks, $H_2S$ is produced and is separated with the hydrogen stream so that the latter normally requires the removal of this $H_2S$ prior to being recycled into the reactors. In various catalytic reforming operations water may also be detrimental to the catalyst or the desired reactions, thus, a hydrogen sulfide removal unit such as provided by the present invention is highly desirable to remove substantially all water that may be present in the recycle stream, as well as $H_2S$.

The gas stream to be purified passes through line 1 and valve 2 into the lower portion of an absorber chamber 3 and upwardly through the latter countercurrently to a descending slurry or suspensoid stream comprising finely divided solid metal oxide, or hydroxide, suspended in a polar organic liquid such as ethylene glycol. It will be assumed in describing the operation of the specific embodiment of this drawing, that iron oxide particles are suspended in ethylene glycol, the latter being a polar organic medium having a boiling point higher than water. However, it may again be noted that other solid metal oxides or hydroxides may be used, and other liquid mediums which are hygroscopic, at least to some extent, and higher boiling than water, such as other of the polyhydric alcohols may well be used as the carrying liquid.

The suspension of iron oxide in ethylene glycol enters the upper portion of the absorber tower 3, from line 4, and effects the continuous turbulent contacting of the $H_2S$ containing gaseous stream as it bubbles downwardly through a plurality of contacting trays 5. The latter may be bubble decks, side-to-side pans, or the like, or a suitable packing material could be used in lieu of the decks. Inasmuch as the iron oxide effects the removal of the hydrogen sulfide by the reaction of forming iron sulfide and water it is desirable to have a direct contact between the gaseous stream and the iron oxide, therefore, in addition to having suitable liquid-gas contacting trays it is preferable that the carrying liquid be capable of absorbing to some extent the hydrogen sulfide in order that it is brought into contact with the iron oxide.

The gaseous hydrogen stream, substantially free of hydrogen sulfide, leaves the upper end of the absorber chamber 3, by way of line 6 and valve 7, while the contacted suspensoid stream of ethylene glycol with resulting iron sulfide and water is withdrawn from the lower end of the tower 3 by way of line 8, valve 9, and pump 10. The contacted suspensoid is then pumped through line 11, valve 12, heater 13, and line 14 to the upper portion of a reactivator tower 15. The heater 13, is indicated as a heat exchanger and provides means for heating the stream to a temperature above that of the boiling point of water, so that as it is introduced into the reactivator tower 15, the water content stream may be flashed off as steam and removed from the upper portion of the tower 15 together with unusued air or other gaseous materials, as will be explained subsequently. The liquid stream is, however, heated to a temperature lower than the boiling point of ethylene glycol, or lower than the boiling point of the particular polar organic liquid medium, where a different carrying medium is utilized.

Preferably the heated suspensoid stream containing the iron sulfide and water is introduced into the upper portion of the reactivator tower 15, so that it may flow downwardly by gravity over a plurality of trays or decks 16. The present embodiment also indicates a suitable distributing head or spray means 17 above the top deck 16, in order to uniformly transverse the cross-sectional area of the reactivator tower 15. In the lower portion of the reactivator, a hot air stream is blown upwardly countercurrently to the descending liquid medium and suspended solid material, so that the latter is contacted by the oxygen of the air stream and re-oxidized to form iron oxide. A heated air stream is also preferably provided to insure the vaporization and substantially complete removal of all of the water or water vapor which may enter the reactivator with the slurry stream. The present embodiment indicates an air blower 18 charging an air stream through line 19 and valve 20 into air heating chamber 21, which in turn discharges a heated air stream through line 22 and a distributing header or nozzle system 23. Thus, air is introduced uniformly into the lower portion of the reactivator tower 15 and below the lowermost contacting deck member 16, so that the hot gaseous stream may flow upwardly, countercurrently to the solid particles and to the carrying medium whereby to effect the desired reactivation of solid iron oxide particles so that they may be re-used in the reactor chamber 3.

The present specific embodiment also indicates a reboiler coil 24 in the lower portion of the reactivator tower 15. This coil 24 may be used to add auxiliary heat to the tower 15 for removing water from the ethylene glycol or other liquid carrying medium, that is not removed in flashing operation within the upper portion in the chamber or by means of the hot air stream. Alternatively, it may be desirable to utilize the reboiler 24 for driving off water that passes down to the lower end of the reactivator instead of heating the air stream passing into the lower end of the reactivator by way of the air blower 18 and heater 21.

Unreacted hydrogen sulfide carried by the ethylene glycol, excess air, and other oxidation products, together with water vapor being boiled or flashed off from the liquid stream, are all passed from the upper end of the reactivator column 15 by way of line 25 and valve 26. This gaseous stream is indicated as being cooled by a suitable heat exchanger 27 and passed by way of line 28 to receiver 29. Thus, resulting water and other condensation products can be removed from the lower end of the receiver 29 by way of line 30 and valve 31, while hydrogen sulfide and other uncondensed gaseous components may be discharged from the upper end of the receiver 29 by way of line 32 and valve 33. The resulting regenerated finely divided solid iron oxide suspended in the ethylene glycol carrying medium, is withdrawn from the lower end of the reactivator tower 15 by way of the control valve 34 and line 35 connecting to the suction side of pump 36. Thus, the latter may return the reactivated suspensoid stream through line 4 to the upper end of the absorber tower 3 for subsequent passage down through the latter as hereinbefore set forth.

It is also to be noted that in effecting the oxidation of the resulting iron sulfide within the reactivation zone 15, in order to reform the desired iron oxide, that sulfur is formed in accordance with the equation:

$$Fe_2S_3 + H_2O + 1\tfrac{1}{2}O_2 \rightarrow Fe_2O_3 + H_2O + 3S$$

Thus, some sulfur remains suspended within the liquid carrying medium, along with the iron oxide. This sulfur may be allowed to build up to a relatively high level, say to the order of about 50% of the total iron oxide inventory, so that it is not necessary that the entire suspensoid stream undergo continuous sulfur removal step. However, some means are preferably incorporated with the processing operation for at least periodically removing this resulting sulfur. In the drawing, a line 37, with control valve 38, provides means for periodically or continuously withdrawing a portion of the regenerated stream from line 4, upon the closing down of valve 39. Line 37 passes the suspensoid stream of iron oxide and sulfur into a sulfur removal zone 40. A sulfur free suspensoid stream returns to line 4 by way of line 41 and valve 42, while sulfur is indicated as being withdrawn from zone 40 by way of line 43 and valve 44.

It is of course not intended to limit this improved regenerative suspensoid H2S removal process to the use of any one particular method of removing sulfur from the desired suspension, and the zone 40 is therefore indicated in a diagrammatic manner. In one type of operation, the regenerated stream can undergo filtering so that the sulfur can be separated from the iron oxide, and the latter subsequently reused with the liquid carrying medium in the absorption zone. For example the residual filtered solid material may be treated with acid to convert the iron oxide to a soluble salt and the sulfur removed in a second filtering step. The iron oxide can be precipitated and recovered from the filtrate by the addition of alkali and subsequent washing. An alternative procedure involves heating the regenerated stream, say to about 250° to 300° F. so that the sulfur content melts, and then effecting a filtering or settling operation to draw off a melted sulfur phase, which in turn permits the recovery of a substantially sulfur free suspensoid stream comprising the desired iron oxide in the polar organic liquid medium.

The foregoing embodiment is illustrative of but one specific arrangement which provides for the continuous hydrogen sulfide removal from a gaseous stream without the necessity of reactivation in fixed bed batch or switch operations, with the accompanying disadvantages of such operations. The contacting apparatus and piping system indicated in the accompanying drawing is of course diagrammatic, and it is not intended to limit the present improved continuous suspensoid method of hydrogen sulfide removal to the use of absorption and reactivation chambers of the particular construction indicated. For example, an alternate method of operation or arrangement, of equipment, may provide for superimposed contacting zones, such as the positioning of the absorber tower above the reactivator zone in a manner permitting the gravity flow of the suspended solid material in a carrying medium directly down into the upper portion of the reactivator section. This arrangement eliminates the pumping means needed for the contacted and sulfided material in the separate side-by-side positioning. Conversely, the reactivator zone may be superimposed above the absorber zone so that the regenerated solid material in the liquid carrying medium flows by gravity directly into the upper portion of the absorber zone to contact the contaminated gas stream, whereby the pumping means for carrying the reactivated sream may be eliminated.

I claim as my invention:

1. A process for removing hydrogen sulfide from a gaseous stream containing the same which comprises contacting said stream in an absorption zone with a finely divided iron oxide carried in suspension in polyhydric alcohol, thereby forming iron sulfide and water and absorbing the water in said polyhydric alcohol, removing the resultant mixture of polyhydric alcohol, iron sulfide and water from said zone, heating and contacting said mixture with oxygen to remove the water and oxidize said iron sulfide to the oxide, and returning the thus regenerated oxide-containing polyhydric alcohol to the absorption zone for reuse in the process.

2. The process of claim 1 further characterized in that said polyhydric alcohol is diethylene glycol.

3. The process of claim 1 further characterized in that said polyhydric alcohol is ethylene glycol.

References Cited in the file of this patent

UNITED STATES PATENTS

| | | |
|---|---|---|
| 2,139,375 | Millar et al. | Dec. 6, 1938 |
| 2,181,433 | Jordan | Nov. 28, 1939 |
| 2,486,778 | Doumani | Nov. 1, 1949 |
| 2,520,947 | Matuszak | Sept. 5, 1950 |

FOREIGN PATENTS

| | | |
|---|---|---|
| 170,572 | Great Britain | Nov. 2, 1922 |

OTHER REFERENCES

Connors et al.: "Operating Problems Related to Gas Treating" Gas Age, March 16, 1950, pages 44 to 47.